Figure 1:
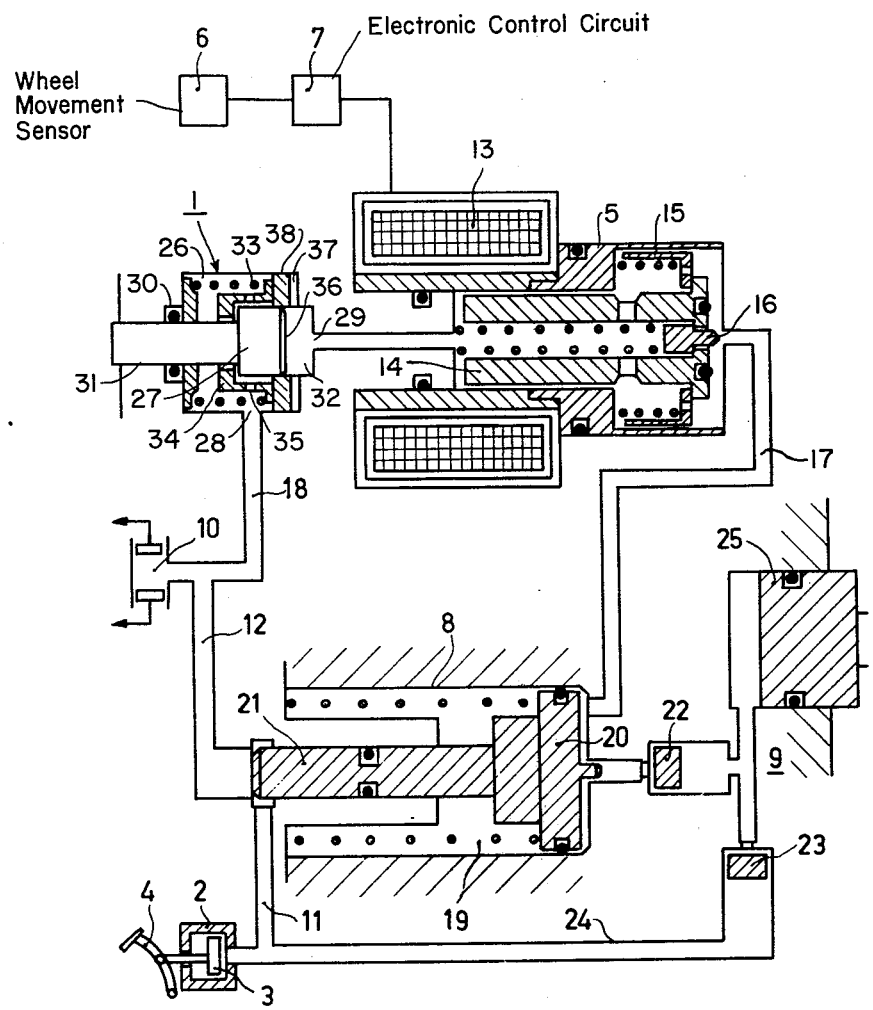

United States Patent [19]
Skoyles

[11] 3,881,781
[45] May 6, 1975

[54] ANTI-LOCK VEHICLE BRAKE SYSTEMS

[75] Inventor: Derek Robert Skoyles, Salfords, Near Redhill, England

[73] Assignee: U.S. Philips Corporation, New York, N.Y.

[22] Filed: June 1, 1973

[21] Appl. No.: 366,189

[30] Foreign Application Priority Data
June 19, 1972 United Kingdom............... 28585/72

[52] U.S. Cl............... 303/21 AF; 303/21 F; 303/63
[51] Int. Cl............................ B60t 8/00; B60t 17/18
[58] Field of Search........ 303/21 F, 21 AF, 6 R, 10, 303/61–63, 68–69, 29, 71; 188/181 A

[56] References Cited
UNITED STATES PATENTS

| | | | |
|---|---|---|---|
| 2,800,370 | 7/1957 | Whitney | 303/21 AF |
| 2,973,994 | 3/1961 | Wells | 303/21 F |
| 3,414,336 | 12/1968 | Atkin et al. | 303/21 F |
| 3,425,751 | 2/1969 | Wehde et al. | 303/21 F |
| 3,608,984 | 9/1971 | Skoyles | 303/21F |
| 3,610,701 | 10/1971 | Riordan | 303/21 F |
| 3,617,098 | 11/1971 | Leiber | 188/181 A |
| 3,819,236 | 6/1974 | Fink et al. | 303/21 F |

*Primary Examiner*—Trygve M. Blix
*Assistant Examiner*—Galen L. Barefoot
*Attorney, Agent, or Firm*—Frank R. Trifari

[57] ABSTRACT

An anti-lock vehicle brake system has been disclosed having a master cylinder, a wheel cylinder in fluid communication therewith, a relief connection in fluid communication with the wheel cylinder and an anti-lock control valve in fluid communication with the relief connection. The anti-lock control valve selectively modulates pressure in the wheel cylinder. The fail-safe improvement disclosed in a fluid inhibitor for restricting fluid flow in the relief connection to the anti-lock control valve upon prolonged actuation of the control valve.

8 Claims, 3 Drawing Figures

ANTI-LOCK VEHICLE BRAKE SYSTEMS

This invention relates to anti-lock brake systems for wheeled vehicles, that is, brake systems including means for improving braking performance of a vehicle by relieving braking pressure applied to a road wheel of the vehicle if the wheel tends to lock following brake application and then increasing the braking pressure again without the need for any change in the actual braking action (by a person using the brake) causing the brake application. Such brake systems can be successful in reducing the risk of skidding due to wheel lock and in maintaining directional control during braking, and can also reduce braking distances.

The invention relates more particularly to a fluid-pressure operated anti-lock vehicle brake system of the character comprising, for use in conjunction with a vehicle wheel and associated wheel brake, a fluid pressure source which in response to a braking action provides fluid under pressure via a fluid pressure connection to the brake, said fluid under pressure being effective to cause the brake to produce braking pressure at said wheel, an anti-lock control valve which is suitably a solenoid valve mechanism, wheel movement sensing means for producing an output function for causing actuation of the anti-lock control valve when a particular criterion related to wheel rotational movement obtains, and a relief connection interconnected with said fluid pressure connection or with the brake and adapted to be opened by said anti-lock control valve, when the latter is actuated, to allow displacement of fluid from said fluid pressure connection or from the brake into said relief connection whereby to cause a reduction in the pressure of such fluid and thereby relieve braking pressure. A preferred criterion for causing actuation of the anti-lock control valve is when wheel slip exceeds a chosen value.

An anti-lock vehicle brake system of the above character may be either of the master cylinder type in which fluid in a master cylinder is pressurised by a piston, when a braking action takes place, to pressurise fluid in said fluid pressure connection, or of the continuously pumped type in which fluid under pressure is available continuously in the brake system and is "modulated" by a braking action such that the pressurised fluid is applied through said fluid pressure connection to the brake to an extent determined by the extent of modulation. Also, the braking action causing movement of the master cylinder piston or of the brake modulator, as the case may be, may be with or without servo or amplifier assistance. Having regard to the above, the term "fluid pressure source" as used in this specification is to be construed accordingly.

The wheel movement sensing means can comprise a mechanical inertia sensor or the combination of a transducer for producing an electrical pulse train which is a function of wheel speed and an electronic control circuit for processing said electrical pulse train.

A separate system of the above character (with a common fluid pressure source) can be provided in respect of each road wheel of a vehicle, but it would also be possible to provide a single system for the two (rear) wheels driven by a vehicle transmission shaft with sensing means asociated with the shaft for producing said output function. As another alternative, a single system may be provided in common for all the road wheels of a vehicle. In this case, each road wheel would have its own wheel movement sensing means and any of the latter would provide said output function to actuate the anti-lock control valve when the appertaining wheel tends towards a locked condition.

Normally, in an anti-lock vehicle brake system of the above character, the period during which the anti-lock control valve is held actuated to relieve braking pressure is very short (i.e., only a small fraction of a second), and the anti-lock control valve is released at the end of the period to allow braking pressure to increase again. This normal anti-lock operation to relieve braking pressure and then to allow it to increase again is repeated each time the wheel tends towards a locked condition during a braking action.

This function of the anti-lock control valve to relieve braking pressure when it is actuated can introduce into the system a possible drawback in that if there is a malfunction causing the anti-lock control valve to be already actuated when initial brake application occurs, braking pressure might be unable to build-up sufficiently to achieve effective braking. Therefore, unless a fail-safe arrangement of some form is provided, which is effective in the event of such a malfunction to inhibit the effect of the actuated anti-lock control valve, a brake failure would result at each normal brake application.

An obvious way of inhibiting the effect of the actuated anti-lock control valve would be to provide in said relief connection a fluid cut-off valve which is displaced due to flow of fluid in said relief connection to a position at which it forms a fluid seal. However, such a fluid cut-off valve has to be ineffectual during normal anti-lock operation.

According to the present invention, there is provided an anti-lock vehicle brake system of the character referred to which includes in said relief connection at the brake side of said anti-lock control valve a fail-safe arrangement comprising, fluid inhibiting means, and mechanical biassing means providing a force for biassing said fluid inhibiting means to an inhibiting position, the arrangement being responsive to fluid pressures in said relief connection such that with said anti-lock control valve closed, fluid pressure in said relief connection due to a braking action and above a certain minimum value determined by the force of the biassing means causes displacement of said fluid inhibiting means to an uninhibiting position at which it cannot impede flow of fluid through said anti-lock control valve when the latter is actuated while said fluid pressure exists, whereas with said anti-lock control valve actuated in the absence of said fluid pressure, a fluid pressure drop across said fluid inhibiting means arising from a subsequent braking action causes said fluid inhibiting means to remain in said inhibiting position in which it prevents or severely restricts flow of fluid through the actuated anti-lock control valve.

Figure 2:
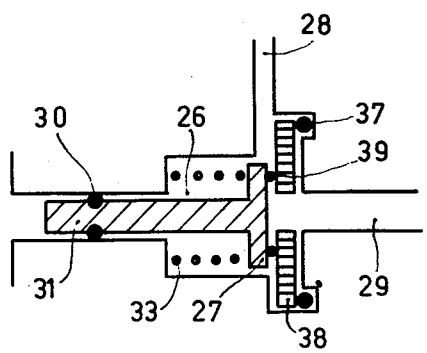

In order that the invention may be more fully understood reference will not be made by way of example to the drawings of which:

FIG. 1. shows diagrammatically a particular form of anti-lock vehicle brake system of the character referred to including a fail-safe arrangement in accordance with the invention; and FIGS. 2. and 3. show respective further fail-safe arrangements according to the invention which are suitable for the system of FIG. 1.

Referring to the drawings, in FIG. 1 a fail-safe arrangement 1 is provided in a particular form of anti-lock vehicle brake system which is described in greater detail than herein in U.K. Pat. No. 1,248,787, although the diagrammatic figure illustrating the system in that patent is drawn differently from the present FIG. 1. This system is a master cylinder type hydraulic system comprising a master cylinder 2 having a piston 3 which is actuable by a brake pedal 4. The system further comprises a solenoid valve mechanism 5 which constitues an anti-lock control valve, a wheel movement sensor 6, an electronic control circuit 7, a fluid flow control arrangement 8, and a scavenging pump 9. A wheel brake 10, for a vehicle road wheel (not shown), is controlled by the system.

In operation of the system of FIG. 1, for normal brake application, fluid in pressure lines 11 and 12 is pressurized by the master cylinder 2 to an extent determined by a driver's braking action and this produces a corresponding braking pressure in the brake 10. If the driver's braking action causes the road wheel with which the brake 10 is associated to exceed a wheel slip of chosen value, this is detected by the wheel movement sensor 6 and the control circuit 7 and the latter energizes the solenoid valve mechanism 5.

The solenoid valve mechanism 5 has an energising coil 13 which on energization attracts an armature 14 to the left (as seen in the drawing) against the force of a spring 15 and the armature 14 carries with it a valve seal 16 which thus unseats from a fluid connection 17. It is mentioned here that subsequent de-energization of the solenoid valve mechanism 5 will allow the valve 16 to re-seal the connection 17 and that for the purposes of the present invention only this simple operation of the solenoid valve mechanism need be appreciated.

As a result of the energization of the solenoid valve mechanism 5, a fluid path is opened by the latter between the connection 17 and a relief connection 18 at the brake 10, so that fluid under pressure at the brake 10 is displaced through said relief connection 18 to the connection 17 (via the fail-safe arrangement 1 and the energized solenoid valve mechanism 5), thereby relieving braking pressure. This displaced fluid enters a reservoir 19 of the fluid flow control arrangement 8 where it is applied behind a spring-loaded piston 20 and displaces this piston 20 to the left (as seen in the drawing), so that the stem 21 of this piston enters the pressure line 12, thereby restricting flow of fluid through this line from the pressure line 11. Braking pressure is now reduced to an extent determined by the extent of displacement of the piston 20 to the left and thus to the volume of displaced fluid. For normal anti-lock operation the solenoid valve mechanism 5 remains energized for only the short time required to allow the braking pressure to fall sufficiently low for the wheel associated with the brake 10 to recover towards free-rolling speed. Once the solenoid valve mechanism 5 is de-energized, the pump 9, which comprises valves 22 and 23 and is returning fluid from the reservoir 19 of the fluid flow control arrangement 8 to the pressure line 11 via a connection 24 gradually removes sufficient fluid from the reservoir 19 for the piston 20 to return under its spring-loading towards its original position, to increase progressively the rate of braking pressure build up. A pump piston 25 of the pump 9 can be driven by the road wheel associated with the brake 10 by means of a shallow cam that rotates with this wheel.

From the foregoing description it will be appreciated that if the solenoid valve mechanism 5 is already energized, due to a malfunction, and if a subsequent braking action takes place in the absence of a fail-safe protection, fluid needed in line 12 to produce braking pressure will be displaced through the energized solenoid valve mechanism with the result that, with the system as so far described, braking pressure could not build-up above a dangerously low value. In fact the highest value which the fluid pressure at the brake can reach in this circumstance is the value of the fluid pressure in the reservoir 19. In order to achieve a substantially normal build-up of fluid pressure in the brake when such a malfunction occurs, the fail-safe arrangement 1 is provided.

The fail-safe arrangement 1 comprises a chamber 26 in which a piston 27 is slidably accommodatd. An inlet port 28 of the chamber 26 has the relief connection 18 connected to it and an outlet port 29 of the chamber 26 communicates with the solenoid valve mechanism 5. An O-ring 30 provides a fluid seal around the reduced diameter portion 31 of piston 27. The piston 27 acts as a restriction in a region 32 of the chamber 26 adjacent the outlet port 29. When there is no fluid under pressure, due to a braking action, in the connection 18, a spring 33 acts through a slidable member 34 to bias the piston 27 to the position shown in which it is just entering the region 32. As fluid pressure builds-up in the connection 18 when a braking action occurs, fluid pressure is built-up in the main region of the chamber 26, and also in the region 32 via an orifice 35 in the member 34 and the gap between the piston 27 and the wall of the region 32. This fluid pressure on the oppositely disposed faces of piston 27 produces a net force equal to the force which would be produced by the same fluid pressure acting on the cross-sectional area of the piston portion 31 and which is opposite in direction to the face produced by the spring 33. This net force exceeds the force of the spring 33 at a selected value of this fluid pressure as determined by the spring constant of spring 33. (The free end of piston portion 31 is conveniently open to atmosphere and it is assumed that the force acting thereon due to atmospheric pressure is included in the selected value of the spring force). Once the force of the spring 33 has been exceeeded, the piston 28 is displaced to the left from its present (inhibiting) position to an uninhibiting position in which it is withdrawn completely from the region 32. Now when the solenoid valve mechanism 5 is energised from an anti-lock action, there is a free passage for displaced fluid to flow from the relief connection 18 through the fail-safe arrangement. Because, in the case of a road surface affording a low co-efficient of friction (e.g., $\mu$—0.1) between itself and a road wheel, fluid pressure at the brake may have built up to only a relatively low value when an anti-lock action is initiated, the fail-safe arrangement has to be designed to have a low pressure-time integral so that the piston 27 will be displaced quickly to the uninhibiting postion at such a low fluid pressure value so as not to impede anti-lock operation. For this reason the positioning of the piston 27 by the force of spring 33 is fairly critical and allowance is made for any resilience, due to air trapped in the solenoid region and/or the compressibility of fluid seals, which fluid pressure at the solenoid side of the chamber 2 would have to take up before fluid pressure is equalized throughout the chamber 2. Such resilience increases the pressure-time integral but its effect can be reduced by including in the fail-safe arrangement 1 a resilient member which fluid pressure introduced into the chamber 2 can deform to compensate for the resilience in the solenoid region so as to substantially equalize the fluid pressure throughout the chamber 26 (including region 32) in a minimal time. In the fail-safe arrangement shown this resilient member is formed by a compressible O-ring 37 which can be compressed by a sliding member 38 in response to fluid pressure urging against this member 38, which latter otherwise forms the outer end of region 32.

For fail-safe protection, the fail-safe arrangement 1 operates as follows. With the solenoid valve mechanism 5 already energized, due to a malfunction, when a braking action occurs, flow of fluid through the relief connection 18 into the chamber 26 and region 32 thereof does not result in a build-up of fluid pressure on the right hand face of piston 27. Instead, there is a flow of fluid through the outlet port 29 and the piston 27 is entrained in this flow of fluid and enters the region 32 where it acts as an increasing restriction to severely limit further flow of fluid through the energized solenoid valve mechanism. The maximum value of fluid pressure that can exist at the end face 36 of the piston 27 is the value of the reservoir pressure so that the piston 27 will thereafter remain in this inhibiting position while the solenoid valve mechanism remains energised. Normal braking is therefore substantially unaffected, but no further anti-lock operation is possible until the fail-safe arrangement is reset and the solenoid valve mechanism fault remedied.

One alternative form of fail-safe arrangement is shown in FIG. 2. This arrangement also comprises, a chamber 26 in which a piston 27 is slidably accommodated, an inlet port 28 for connection to the system's relief connection (18), an outlet port 29 for communicating with the solenoid valve mechanism (5), an O-ring 30 providing a seal about the reduced diameter portion 31 of the piston 27, a biassing spring 33 for the piston 27, a compressible O-ring 37 and a member 38 for compressing the O-ring 37 in response to fluid pressure in the chamber 26, all these elements corresponding to their correspondingly referenced counterparts in the fail-safe arrangement 1 of FIG. 1. The fail-safe arrangement of FIG. 2 is different from the fail-safe arrangement (1) in that it includes an O-ring seal 39 at its end face.

In the arrangement of FIG. 2, the biassing of the piston 27 to the inhibiting position is not so critical, the force of spring 33 merely being required to be sufficient to maintain the piston 27 in the inhibiting position shown in which the O-ring seal 39 seals the outlet port 29. The operation of this arrangement is as follows. With the solenoid valve mechanism (5) closed, build-up of fluid pressure at the inlet port 28 displaces the piston against its spring biassing to the uninhibiting position, as in the fail-safe arrangement (1). However, in this instance, the compressible O-ring 37 is more necessary in order that the fluid pressure around the piston 27 can be equalised, allowing the fluid seal to be broken. With the piston 27 in its uninhibiting position, anti-lock operation is unimpeded. With the solenoid valve mechanism (5) already energised when a braking action occurs, fluid pressure cannot build-up at the end face of the piston 27, but it can build-up in the chamber 26 at the other side of this piston so that the force due to spring 33 plus the force due to fluid pressure in the chamber 26 maintains the piston 27 in the inhibiting position with the fluid seal made by the O-ring seal 39 unbroken.

Figure 3:
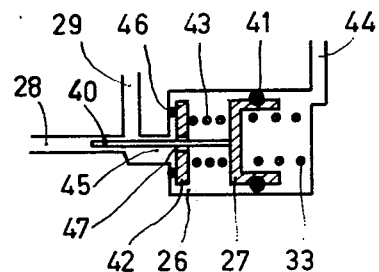

Another alternative form of fail-safe arrangement is shown in FIG. 3. This arrangement similarly comprises, a chamber 26 in which a piston 27 is slidably accommodated, an inlet port 28 for connection to the system's relief connection (18), an outlet port 29 for communicating with the solenoid valve mechanism (5) and a biassing spring 33 for the piston 27. This fail-safe arrangement differs from the other two fail-safe arrangements described above in that the inlet ports 28 and 29 are in direct communication, instead of via the chamber 26, and that a restrictor 40 carried on the piston 27 is arranged to extend into the inlet port 28. Also, an O-ring seal 41 provides a fluid seal between the piston 27 and the wall of the chamber 26. The arrangement additionally comprises a valve member 42 and an associated biassing spring 43, but the operation of the arrangement will first be considered with the assumption that this member 42 and spring 43 are not provided.

In the absence of fluid pressure, due to a braking action, at the inlet port 28, the spring 33 biasses the piston 27 to the position shown in which the restrictor 40 is penetrating the inlet port 28. With the solenoid valve mechanism (5) closed build-up of fluid pressure at the inlet port 28 acts initially on the restrictor 40, and also to a small extent on the piston 27 as fluid enters the chamber 26 past the restrictor 40, to displace the piston 27 against its spring biassing. The rate of this displacement increases as the restriction afforded by restrictor 40 decreases, and when the latter moves clear of the inlet port 28 the piston 27 is displaced rapidly to an uninhibiting position at the extreme right of the chamber 26. The chamber 26 at the side of the piston 27 remote from the inlet port 28 communicates with atmosphere or, as indicated, with the reservoir (19) via an exhaust port 44 so that only a low pressure, which does not impede the displacement of the piston 27 to the right exists at that side of the piston 27. With the solenoid valve mechanism (5) already energised when a braking action occurs, fluid pressure cannot build-up sufficiently in the chamber 26 to displace piston 27 to the right against its spring-biassing.

Consequently, the restrictor 40 remains in its inhibiting position in the inlet port 28 to maintain the restriction therein so that, although there is leakage past the restrictor 40 to the opened solenoid valve mechanism, this leakage rate is sufficiently low for fluid pressure at the brake to build-up sufficiently to achieve effective braking.

The valve member 42 and its biassing spring 43 provide a damping action which delays the displacement of the piston 27 to its inhibiting position. This delay is desirable when fluid pressure at the brake has to be reduced to a very low value, as would be necessary for effective anti-lock operation on a very slippery surface. Without the valve member 42 the arrangement could "fail-safe" during such an anti-lock operation in which fluid pressure at the inlet port 28 falls to a sufficiently low value for the spring 33 to start urging the piston 27 towards its inhibiting position. The valve member 42 does not impede the initial displacement of the piston 27 to its uninhibiting position because the valve member 42 is first displaced from orifice 45 against the force of spring 43 as soon as fluid pressure starts to build-up at the inlet port 28, but as this fluid pressure decays during anti-lock operation, the valve member 42 is urged to the position shown, by the force due to the fluid pressure difference across it and the force of spring 43, in which position an O-ring seal 46 on the valve member 43 seals the orifice 45 so that fluid pressure in chamber 26 now has to decay more slowly through a smaller orifice 47 in the valve member 42 so that the displacement of piston 27 towards the inhibiting position is damped. Similar damping could also be applied to the other two fail-safe arrangements previously described in which applications, the valve member 42 would serve to restrict fluid leaving the chamber through the outlet port.

Each of the fail-safe arrangements described above can also give fail-safe protection in the event that the solenoid valve mechanism (5) remains energized, due to a malfunction, at the end of an anti-lock operation, in that in each arrangement the spring 26 would eventually displace the piston 27 to the inhibiting position when the fluid pressure at the outlet port has fallen to a sufficiently low value.

What we claim is:

1. In an anti-lock vehicle brake system of the character referred to which includes a master cylinder, a wheel cylinder in fluid communication therewith, a relief connection in fluid communication with said wheel cylinder and an anti-lock control valve in fluid communication with said relief connection, said anti-lock control valve selectively modulating pressure in said wheel cylinder the fail-safe improvement comprising, means for inhibiting fluid flow from said relief connection to said anti-lock control valve, said means for inhibiting including mechanical biassing means providing a force for biassing said means for inhibiting to an inhibiting position, said means for inhibiting being responsive to fluid pressures in said relief connection such that with said anti-lock control valve closed, fluid pressure in said relief connection due to a braking action and above a certain minimum value determined by the force of the biassing means causes displacement of said fluid inhibiting means to an unhibiting position at which it cannot impede flow of fluid through said anti-lock control valve when the latter is actuated while said fluid pressure exists, and with said anti-lock control valve actuated in the absence of said fluid pressure, a fluid pressure drop across said fluid inhibiting means arising from a subsequent braking action causes said fluid inhibiting means to remain in said inhibiting position in which it severely restricts flow of fluid through the actuated anti-lock control valve.

2. A system as claimed in claim 1, wherein means for inhibiting includes a chamber having an inlet port in fluid communication with said relief connection and an outlet port in fluid communication with said anti-lock control valve and carried within said chamber is a piston disposed for sliding reciprocal movement within said chamber, said chamber surrounding said piston and condensating fluid pressure thereabout to permit pressure in the chamber to equalize, and a spring for urging said piston towards said inhibiting position, said piston having a stem which extends in a sealing manner through a wall of said chamber to a low pressure region permitting displacement of said piston between said inhibiting and uninhibiting positions under the influence of fluid pressures in said chamber.

3. A system as claimed in claim 2, wherein a portion of the chamber wall adjacent the outlet port is selectively displaced to facilitate equalization of fluid pressure in the chamber.

4. A system as claimed in claim 3, wherein said piston is in close sliding engagement with a portion of said chamber adjacent said outlet port to afford a fluid restriction therein.

5. A system as claimed in claim 3, wherein said piston has a seal on the end face thereof facing said outlet port, whereby to effect a fluid seal at the output port when the piston is in said inhibiting position.

6. A system as claimed in claim 1, wherein the fail-safe arrangement includes a chamber having an inlet port communicating with said relief connection, in which chamber is slidably accommodated a piston having a restrictor member extending through the inlet port of the chamber, and a spring for urging said piston towards said inhibiting position, said piston and spring comprising, respectively, said means for inhibiting comprising a restrictor member entering said relief connection to form a fluid restriction therein when the piston is in said inhibiting position, a fluid seal being provided between the piston and the chamber wall so that fluid pressure entering the chamber via said inlet port acts on one side only of the piston, the chamber at the other side of the piston communicating with a low pressure region permitting displacement of said piston between said inhibiting and uninhibiting positions.

7. A system as claimed in claim 6, wherein said low pressure region is an atmospheric pressure.

8. A system as claimed in claim 7, including a valve member and an associated biassing spring which provide a damping action for delaying displacement of said piston towards its inhibiting position during anti-lock operation, said valve member being urged by said biassing spring into sealing engagement with the particular port through which fluid leaves the chamber, when fluid pressure in the chamber reduces to a given value, to permit fluid to leave the chamber more slowly through a limiting aperture in the valve member.

* * * * *